United States Patent [19]
Peoples

[11] 3,746,996
[45] July 17, 1973

[54] ASYNCHRONOUS SINGLE-SIDEBAND DEMODULATION

[75] Inventor: John Terrance Peoples, Berkeley Heights, N.J.

[73] Assignee: Bell Telephone Laboratories, Incorporated, Murray Hill, N.J.

[22] Filed: Dec. 29, 1971

[21] Appl. No.: 213,595

[52] U.S. Cl. .................... 325/330, 325/329, 329/50, 328/166, 329/50

[51] Int. Cl. .............................................. H03d 1/24

[58] Field of Search ...................... 325/65, 329, 330, 325/474, 476; 329/50; 328/165, 166

[56] References Cited

UNITED STATES PATENTS 3,508,155 4/1970 Voelcker, Jr. ...................... 325/329

*Primary Examiner*—Benedict V. Safourek
*Attorney*—W. L. Keefauver

[57] ABSTRACT

Asynchronous or noncoherent demodulation, i.e., demodulation without employing a carrier wave at the receiver to multiply the incoming channel signal, of single-sideband signals is accomplished using only the instantaneous phase deviation information of the channel signal. The required receiver comprises an instantaneous phase deviation detector followed by a nonlinear, post-detection processor including a cosine generator in parallel with the tandem combination of a Hilbert transform circuit and an exponential amplifier.

8 Claims, 1 Drawing Figure

PATENTED JUL 17 1973
3,746,996
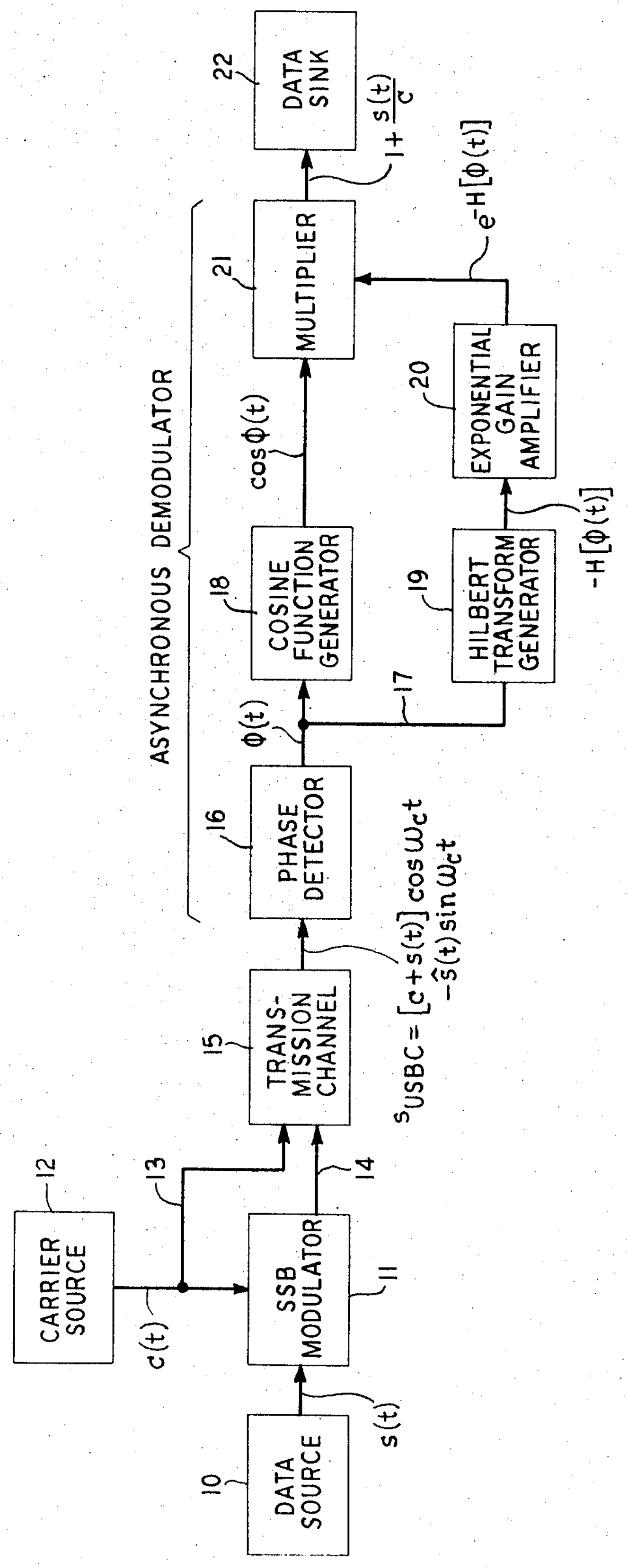

ASYNCHRONOUS SINGLE-SIDEBAND DEMODULATION

FIELD OF THE INVENTION

This invention relates to communication systems employing single-sideband modulation techniques and more specifically to asynchronous or noncoherent demodulation in such systems.

BACKGROUND OF THE INVENTION

Single-sideband amplitude modulation (SSB-AM) is utilized in radio and telephone carrier transmission systems primarily for bandwidth conservation and efficiency. Increased efficiency is effected by suppressing or reducing the transmitted carrier signal. However, the elimination or reduction of the carrier at the transmitter leads to formidable problems in providing demodulation at the receiver. The method of demodulation which depends upon multiplying the incoming channel signal at the receiver by a replica of the transmitter carrier wave is called synchronous, homodyne or coherent detection. Various methods have been devised for obtaining a suitable local carrier at the receiver. One common method employs highly stable, matched-frequency oscillators at the transmitter and receiver. One obvious difficulty is the tendency of the oscillators to drift apart; also, there is no guarantee that the oscillators are in phase synchronism or phase-lock. Another technique requires highly selective phase and frequency control circuits to detect and amplify a low-level transmitted pilot carrier.

Another vital consideration is that it may not necessarily be desirable to restore the carrier to the receiver purely on the basis of frequency accuracy, e.g., Doppler frequency shifts may be encountered.

The requirements for accuracy in the demodulator carrier frequency are highly dependent on the particular application. For voice communications, errors up to 50 Hz are tolerable. When data applications are considered, virtually no error in carrier reference relative to the received signal is allowable.

Inasmuch as the SSB signal can be regarded as the resultant of the baseband signal modulating a carrier wave and the Hilbert transform of the baseband signal modulating the quadrature carrier wave, it can also be represented as a hybrid modulation signal having an amplitude-modulated envelope and a phase-modulated carrier wave.

It is an object of this invention to demodulate an SSB-modulation information signal having an exalted carrier component asynchronously and without distortion exclusively from the instantaneous phase deviation characteristic of the received channel signal.

It is a further object of this invention to demodulate an SSB signal asynchronously in a manner which avoids certain of the complexities of synchronous demodulation such as the transmission of pilot tones which control a demodulating carrier wave source at the receiver.

SUMMARY OF THE INVENTION

According to this invention, the above and other objects are realized by detecting the instantaneous phase deviation, hereafter called the phase, of a single-sideband modulated channel signal, which includes an exalted carrier component, and then subjecting the detected phase to nonlinear, post-detection processing. The phase detection is noncoherent, i.e., does not require the generation or derivation of a demodulating carrier wave in the receiver. The post-detection processor comprises means for deriving the cosine of the detected phase; means for deriving the Hilbert transform, i.e., a broadband phase-shifting by −90 degrees for positive frequency components; means for deriving the exponential of the inverted Hilbert transform of the detected phase; means for taking the product of the cosine of the detected phase and the exponential of the inverted Hilbert transform of the detected phase to form an output signal differing from the transmitted baseband information signal by a direct-current (dc) component and a scaling factor; and means for filtering the amplitude of the output signal to remove the dc component.

The required nonlinear processing can be accomplished by known operational amplifiers provided with feedback networks of the appropriate character to generate the cosine function, the exponential (inverse logarithmic) and the multiplying functions.

DESCRIPTION OF THE DRAWING

The principles of the invention will become apparent from the following detailed description and the drawing depicting in block diagram form a preferred embodiment thereof.

DETAILED DESCRIPTION OF THE PREFERRED EMBODIMENT

An introductory analysis of the general SSB-AM signal will lead to a better understanding of the present invention.

It is well known that the upper-sideband SSB-AM signal an be written as (see in this connection Chapter 1 of *Communication Systems and Techniques* by M. Schwartz, W. R. Bennett and S. Stein, McGraw-Hill Book Company, 1966):

$$s_{USB}(t) = s(t) \cos \omega_c t - \hat{s}(t) \sin \omega_c t \quad (1)$$

where $s(t)$ = baseband information signal;

$\hat{s}(t)$ = Hilbert transform of $s(t)$, i.e., the information signal $s(t)$ passed through a linear network which shifts the phase of each frequency component in $s(t)$ by exactly −90 degrees, bearing in mind that physical realizability requires that phase be an odd function of frequency, without changing the magnitude of any of these components;

$\omega_c$ = carrier frequency.

It may be noted that the lower sideband SSB signal can be represented by an equation differing from equation (1) only by substituting a plus (+) sign for the minus (−) sign indicated.

A carrier component of strength $c$ is added to the signal represented by equation (1). This amplitude $c$ is chosen to be greater than the amplitude of any allowable modulation component. Thus, an augmented equation (1) can be written as $$s_{USBC}(t) = [c + s(t)] \cos \omega_c t - \hat{s}(t) \sin \omega_c t. \quad (2)$$

Equivalently, by manipulation of standard trigonometric identities, equation (2) becomes $$s_{USBC}(t) = \sqrt{[c + s(t)]^2 + \hat{s}^2(t)} \cos [\omega_c t + \phi(t)] \quad (3)$$

where $\phi(t)=\tan^{-1}[\hat{s}(t)/c + s(t)$ $\phi(t) = \tan^{-1}[\hat{s}(t)/c + s(t)]$ (4)

The function $\phi(t)$ is the phase deviation of the received signal and is hereinafter designated the phase function. The expression multiplying the cosine term is the envelope function. Equation (3) can be normalized to offset the effect of the added carrier component as follows:

$$s_{USBC}(t)/c = \sqrt{[c+s(t)]^2+\hat{s}^2(t)} \times \cos[\omega_c t + \tan^{-1}\hat{s}(t)/c+s(t)]. \qquad (5)$$

Let the envelope function in equation (5) be represented as an exponential time function; thus $$e^{-f(t)} = \sqrt{[c+s(t)]^2+\hat{s}^2(t)/c^2}. \qquad (6)$$

In logarithmic form equation (6) becomes $$f(t) = -\ln\sqrt{\phantom{x}}, \qquad (7)$$

where the full expression under the radical in equation (6) is understood to be incorporated in equation (7).

The Fourier transform, i.e., conversion of a time function into a frequency function through integration of the product of the given time function and a particular exponential function ($e^{-j\omega t}$), of equation (4) is $$\Phi(j\omega) = \int_{-\infty}^{\infty} \tan^{-1}[\;]e^{-j\omega t}dt, \qquad (8)$$

where the bracketed term is understood to be the same as that shown in full in equation (4).

Similarly, the Fourier transform of equation (7)

$$F(j\omega) = -\int_{-\infty}^{\infty} \ln\sqrt{\phantom{x}}\,e^{-j\omega t}dt. \qquad (9)$$

Equations (8) and (9) can be combined in complex form by allowing equation (9) to be the real part and equation (8) the imaginary part; thus $$-F(j\omega)+j\Phi(j\omega) = \int_{-\infty}^{\infty}\{\ln\sqrt{\phantom{x}}+j\tan^{-1}[\;]\}e^{-j\omega t}dt. \qquad (10)$$

Consider the baseband signal $$m_{UC}(t)/c = 1+s(t)/c+j\,\hat{s}(t)/c. \qquad (11)$$

It is an analytic function, i.e., a functional representation in the complex plane with derivatives at every finite point and free of singularities (poles) in the finite plane.

The equivalent exponential form of equation (11) is $$m_{UC}(t)/c = \sqrt{\phantom{x}}\;e^{j\tan^{-1}[\;]}. \qquad (12)$$

The natural logarithm (restricting its range to its principal value) of equation (12) is $$\ln[m_{UC}(t)/c] = \ln\sqrt{\phantom{x}}+j\tan^{-1}[\;]. \qquad (13)$$

Consequently, equation (10) can be rewritten as $$-F(j\omega)+j\Phi(j\omega) = \int_{-\infty}^{\infty}\ln\frac{m_{UC}(t)}{c}e^{-j\omega t}dt. \qquad (14)$$

As long as $]c+s(t)]$ is positive, i.e., the transmitted exalted carrier component exceeds the modulation component of greatest amplitude, the range of the inverse tangent in the above equations lies between plus and minus $\pi/2$ radians. Therefore, $$-\tan^{-1}[\;] = \tan^{-1}-[\;]. \qquad (15)$$

By a line of reasoning analogous to that used in the derivation of equation (14), and giving due regard to equation (15), equations (8) and (9) can be rewritten as an analytic function of another baseband signal:

$$m_{LC}/c = 1+s(t)/c = 1+s(t)/c-j\,\hat{s}(t)/c. \qquad (16)$$

Thus, $$-F(j\omega)-j\Phi(\omega) = \int_{-\infty}^{\infty}\ln\frac{m_{LC}(t)}{c}e^{-j\omega t}dt. \qquad (17)$$

One versed in complex-variable theory (see in this connection Chapter 10 of F. B. Hildebrand in *Advanced Calculus for Applications*) will realize that the integrals on the right-hand sides of equations (14) and (17) vanish, i.e., equal zero, under the constraint of physical realizability. Consequently, from equations (14) and (17)

$$F(j\omega) = j\Phi(\omega) \text{ for } \omega < 0, \text{ and} \qquad (18)$$

$$F(j\omega) = -j\Phi(\omega) \text{ for } \omega > 0. \qquad (19)$$

Upon taking the inverse transform of $F(j\omega)$, and observing that $f(t)$ in equation (7) has no dc component, $$f(t) = H[\phi(t)], \qquad (20)$$

where $H[\cdot]$ designates the Hilbert transform of the function.

Equation (20) shows that the function $f(t)$ assumed in equation (6) is precisely the Hilbert transform of the phase function $\phi(t)$. Specifically, the envelope function becomes:

$$e^{-f(t)} = \sqrt{\phantom{x}} = e^{-H[\tan^{-1}(\hat{s}(t)/c+s(t))]} = e^{-H[\phi(t)]}. \qquad (21)$$

From equation (4) it is readily determined that $$\cos\phi(t) = c+s(t)/\sqrt{[c+s(t)]^2+\hat{s}^2(t)} \qquad (22)$$

By combining equations (21) and (22) it then follows that $$e^{-H[\phi(t)]}\cos\phi(t) = c+s(t)/c = 1+s(t)/c \qquad (23)$$

Equation (23) states that a scaled linear version of the baseband signal $s(t)$ can be recovered from an asymmetrical sideband signal solely from phase information. Specifically, the baseband signal is proportional to the product of the cosine and the exponential of the inverted Hilbert transform of the phase of a received SSB-AM signal.

The single figure of the drawing is a block diagram of an embodiment of an asynchronous SSB demodulator which implements equation (23). The asynchronous demodulator operates at the receiver terminal of a data transmission system. The transmitting terminal comprises data source 10, carrier source 12 and modulator 11. Data source 10 can supply digital or analog data to the system. Speech signals can also be transmitted over the system, but asynchronous demodulation offers a greater advantage for digital signals whose waveshape must be accurately preserved. Carrier source 12 supplies a cosinusoidal wave on which the digital signals are to be modulated. Baseband data signals from source 10 and carrier signals from source 12 are combined in SSB modulator 11 to form a channel signal by either the direct or phase-shift method. The direct method generates a conventional double-sideband suppressed carrier wave signal and then filters out one of the sidebands. The phase-shift method is practiced by adding the baseband modulating wave multiplied by the cosine of the carrier wave with the Hilbert transform of the baseband modulating wave multiplied by the sine of the carrier wave. Either method results in the physical transmission of a single sideband over conductor 14 onto transmission channel 15.

A discrete carrier component is inserted over conductor 13 at one edge of the transmitted sideband. The composite channel signal is represented by equation (2) and is seen to comprise a single sideband signal with an exalted carrier component.

Transmission channel 15 is typically a telephone voice channel, but in any case a channel which is band-limited.

The asynchronous demodulator, which operates on the received channel signal, comprises phase detector 16, cosine function generator 18, Hilbert transform generator 19, exponential gain amplifier 20 and multiplier 21. Phase detector 16 can advantageously comprise a conventional zero-crossing frequency detector in cascade with an integrator. The output of phase detector 16 is of the form defined by equation (4).

The cosine of the phase of the received signal is taken in cosine generator 18, which is illustratively a nonlinear amplifier with diode-controlled feedback to have a gain curve in cosinusoidal form. Such amplifiers are well known for use in analog computers.

The output of detector 16, which is proportional to the instantaneous phase deviation $\phi(t)$ in equation (4), is branched on conductor 17 to Hilbert transform generator 19, which can be realized as a wideband 90-degree phase-splitting network in either analog or digital form. Since the negative of the Hilbert transform is required, it is assumed that generator 19 includes an inverter.

The inverted Hilbert transform of the phase of the received signal is amplified in exponential gain amplifier 20, which can be implemented by an operational amplifier with a nonlinear exponential gain function.

Multiplier 21 multiplies together the respective cosine and exponential functions of the phase of the received signal as required by equation (23). Multiplier 21 can be implemented by a conventional quarter square, or equivalent, analog multiplier. The output of multiplier 21 is a scaled version of the information signal $s(t)$ and requires only dc filtering and a gain adjustment in data sink 22 to form the desired baseband signal.

Expressed as a method, the asynchronous demodulation system of this invention comprises the steps of 1. generating the instantaneous phase deviation, or simply phase, of a received single-sideband modulated carrier wave;
2. taking the cosine of the phase of the received signal;
3. taking the Hilbert transform of the phase of the received signal, i.e., rotating all realizable frequency components through −90 electrical degrees without altering their relative amplitudes;
4. inverting the Hilbert transform obtained in step (3) and amplifying it exponentially;
5. multiplying together the results of steps (2) and (4) to obtain a scaled version of the baseband information signal; and
6. ) filtering the dc component from the multiplier output.

Practical applications for the asynchronous demodulation method of this invention extend to voice carrier transmission systems — as used, for example, in telephony — and to digital data transmission systems in which dc components have been removed from the baseband signal prior to modulation. The partial-response signal designated Class IV by E. R. Kretzmer in U. S. Pat. No. 3,388,330 issued June 11, 1968, is a notable example of a digital data signal which posseses no dc component.

While this invention has been disclosed by way of a specific illustrative embodiment, it will be apparent to those skilled in the modulation art that this invention is subject to extensive modification within the spirit and scope of the appended claims.

What is claimed is:

1. A receiver for recovering asynchronously a baseband information signal transmitted in a single sideband modulated wave comprising means for detecting the instantaneous phase deviation of said single sideband modulated wave, means for generating a first nonlinear function of said phase deviation from said detecting means, means for producing the inverted Hilbert transform of said phase deviation from said detecting means, means for operating on said inverted Hilbert transform of said phase deviation by a second nonlinear function, and means for multiplying said first and second nonlinear functions of said phase deviation respectively produced by said generating means and said operating means to form an output signal which is a linear function of said baseband information signal.

2. The receiver defined in claim 1 in which said means for generating said first nonlinear function is a cosine network.

3. The receiver defined in claim 1 in which said means for producing the inverted Hilbert transform of said phase deviation is a wideband, all-pass, 90-degree phase-shifting network.

4. The receiver defined in claim 1 in which said means for operating on the inverted Hilbert transform of said phase deviation by a second nonlinear function is an amplifier with an exponential gain characteristic.

5. An asynchronous receiver for recovering an information signal from a single-sideband modulated wave comprising means for detecting the instantaneous phase deviation of said single-sideband modulated wave, means for generating the cosine function of said phase deviation obtained from said detecting means, means for phase shifting all frequency components of said phase deviation obtained from said detecting means by 90 electrical degrees without altering the amplitudes of any of them, further means for operating on the phase-shifted frequency components from said phase shifting means to derive an exponential function thereof, and means for multiplying the respective cosine and exponential functions from said generating means and from said operating means to form an output signal proportional to the desired information signal.

6. The method of recovering a baseband information signal transmitted as a single sideband of wave energy comprising the steps of a. detecting the instantaneous phase deviation of said single sideband of wave energy, b. generating a first nonlinear function of said phase deviation, c. generating an inverted Hilbert transformation of said phase deviation, d. generating a second nonlinear function of said inverted Hilbert transformation, and e. forming the product of said first and second nonlinear functions to form a signal which is a linear function of said baseband information signal.

7. The method of recovering a baseband information signal according to claim 6 in which said first nonlinear function produces the cosine of said phase deviation.

8. The method of recovering a baseband information signal according to claim 6 in which said second nonlinear function produces the exponential of the inverted Hilbert transformation of said phase deviation.

* * * * *